United States Patent [19]
Ooe et al.

[11] Patent Number: 5,200,043
[45] Date of Patent: Apr. 6, 1993

[54] METHOD FOR TREATING WASTE GAS

[75] Inventors: Takashi Ooe; Hiroyasu Minoshima; Akiko Miura, all of Yokohama; Toshinori Matsuda, Kamakura; Ryohei Itatani, Kyoto, all of Japan

[73] Assignee: Mitsui Toatsu Chemicals, Inc., Tokyo, Japan

[21] Appl. No.: 814,800

[22] Filed: Dec. 31, 1991

Related U.S. Application Data

[62] Division of Ser. No. 610,149, Nov. 6, 1990, Pat. No. 5,130,007.

[30] Foreign Application Priority Data

Nov. 8, 1989 [JP] Japan ................... 1-288694

[51] Int. Cl.$^5$ ............... C01B 33/027; C01B 33/029; C01B 35/00
[52] U.S. Cl. .................... 204/130; 204/156; 204/157.3; 204/157.45
[58] Field of Search .............. 204/130, 156, 157.3, 204/157.45

[56] References Cited

U.S. PATENT DOCUMENTS

| | | | |
|---|---|---|---|
| 3,793,171 | 2/1974 | Zabolotny et al. | 204/130 |
| 3,994,790 | 11/1976 | Inoue | 204/130 |
| 4,883,570 | 11/1989 | Efthimion et al. | 204/157.3 X |

FOREIGN PATENT DOCUMENTS

| | | |
|---|---|---|
| 0296720 | 12/1988 | European Pat. Off. |
| 0343987 | 11/1989 | European Pat. Off. |
| 51-129868 | 11/1976 | Japan |
| 58-6231 | 1/1983 | Japan |
| 63-277779 | 11/1988 | Japan |
| 1-297126 | 11/1989 | Japan |

OTHER PUBLICATIONS

From Meetings for the Study of Plasma Electronics, Jan., 1986, sponsored by the Society of Applied Physics.

Japanese Patent Abstracts, week 9026, section CH, class J, p. 11, abstract No. 90-197810/26, Derwent Publications Ltd., London, GB; & JP-A-2 131 120; May 18, 1990.

Japanese Patent Abstracts, week 9026, section Ch, class J, p. 10, abstract 90-197807/26, Derwent Publications Ltd., London, GB; & JP-A-2 131 115; May 18, 1990.

Primary Examiner—Donald R. Valentine
Attorney, Agent, or Firm—Burns, Doane, Swecker & Mathis

[57] ABSTRACT

A waste gas treating apparatus including a discharge tube comprising a tubular container having a gas introduction opening and a gas leading opening and at least one pair of an anodes and a cathodes placed within the container, a dc or ac power supply connected to said electrodes, and a gas flow passage formed in the discharge tube wherein at least a pair of anodes is provided opposite to each other in the flow passage, at least a pair of cathodes is provided opposite to the anodes in a direction nearly at right angles to the anodes without contacting the anodes in a space including the pair of anodes;

a set of electrodes is composed of said pair of anodes and said pair of cathodes;

a part or the whole of said anodes and said cathodes are composed of a plurality of plates or pillars and they are electroconductively connected integrally; and a device for forming a magnetic field application device forming a dc or ac magnetic field in the opposing direction of the cathodes is fixed to the discharge tube.

5 Claims, 5 Drawing Sheets

METHOD FOR TREATING WASTE GAS

This application is a divisional of application Ser. No. 07/610,149, filed Nov. 6, 1990, now U.S. Pat. No. 5,130,007.

This invention relates to an apparatus for treating a waste gas, and more specifically to an apparatus for treating a waste gas by discharge plasma. More particularly, this invention relates to a waste gas treating device for treating reactive gases discharged from various semi-conductor production facilities in various thin film forming techniques utilizing reduced pressures (such as chemical vapor deposition method, or plasma CVD method), an oxidation technique utilizing reduced pressures, a diffusion technique, and a dry etching technique, with plasma under reduced pressures to render them non-toxic irrespective of their amount.

There are a variety of gases which are used in various semiconductor production facilities for thin film formation under reduced pressures, oxidation and diffusion and dry etching. In particular, reactive gases are not always completely consumed in the respective facilities, and are discharged as unreacted gases or as mixtures with by-product gases occurring at the time of semiconductor production, through a vacuum discharging system.

Many of these gases have combustibility and explosiveness or toxicity, and then they are released without treatment, they may be the cause of disaster or pollution. Hence, the allowable concentrations of these gases in the atmosphere are prescribed.

Methods used heretofore to render these gases non-pollutional include a chemical treatment involving a catalyzed reaction, absorption and adsorption by means of a scrubber, or a dry adsorption by using various adsorbents. Gases which are likely to have a danger of burning or explosion are released after they are diluted with a large amount of an inert gas.

The above methods are all performed at ordinary pressures. They are not effective means against safety in a pressure reduction piping portion including a vacuum discharge facilities or in an ordinary pressure piping section leading to an atmospheric pressure treating facilities, some examples of accidents have been reported.

On the other hand, as a treating method under reduced pressures, there have been proposed methods of using discharge to treat a waste gas non-pollutional. These methods are characterized in that as against the aforesaid treatment under ordinary pressures, gases to be treated are treated under reduced pressure before they reach the vacuum discharge facilities. For example, Japanese Laid-Open Patent Publication No. 129868/1976 discloses that by reacting a waste gas containing a toxic substance with an oxidizing agent in a plasma space, the toxic substance is converted into a stable compound and removed from the waste gas. Furthermore, Japanese Laid-Open Patent No. 6231/1983 describes a waste gas treating apparatus for decomposing a waste gas with a discharge plasma and discharging it. However, the treating methods utilizing discharge have some problems and no practical utility can be found because with these methods, it is difficult to maintain a stable state of plasma under varied loadings, especially under varied pressure, and there is a limit in the range of application.

In recent years, a method utilizing plasma on which a magnetic field is superimposed (magnetic field superimposing method) was proposed as a means of maintaining a stable plasma state even under varied pressures (Society of Applied Physics, Meetings for the Study of Plasma Electronics, January 1986). In this magnetic field superimposing method, a direct current or an alternating current magnetic field is applied at an angle of about 45° to about 135° with respect to the direction of a magnetic field formed by an electrode. As a result, the radius of pivoting of an electron in a plasma becomes small, and the electron can pivot between the electrodes, and a stable plasma can be maintained under varied pressures ranging from 0.01 m torr to several tens of torr.

The waste gas treatment utilizing discharge must be carried out as above under reduced pressure before it leads to a vacuum discharge facilities. Necessarily, the waste gas treating apparatus is arranged between each semiconductor production facilities and a vacuum discharge facilities. Accordingly, in order to use the treatment under reduced pressures actually for practical utility the treating device should be easily incorporated between these facilities while maintaining its treating ability, and the gas flow passages inside the treating apparatus should have such a structure as to suppress the decrease in the discharge conductance utmost. The prior art, however, proposed only conceptional methods or apparatus which fulfill such necessary conditions for realizing such practical utility. A practical waste gas treating apparatus has not yet come into acceptance.

It is an object of this invention to fully satisfy necessary conditions for realizing an apparatus having utility, and to realize a treating apparatus by using discharge which can maintain a stable treating ability over a long period of time.

The present inventors extensively made investigations, and found, that by disposing cathodes opposite to each other and anodes opposite to each other so as to form a space defined by an anode pair and a cathode pair, and constructing a part or the whole of the anodes and cathodes from a plurality of plates or pillars, and applying a magnetic field in the direction opposite to the cathodes, the capacity of the treating apparatus which treats the gas per unit volume can be increased very much and the treating apparatus can be stably operated over a long period of time.

Thus, according to this invention, there is provided a waste gas treating apparatus including a discharge tube comprising a tubular container having a gas introduction opening and a gas leading opening and at lease one pair of anodes and cathodes, placed within the container a dc or an ac power supply connected to said electrodes, and a gas flow passage formed in the discharge tube; wherein at least a pair of anodes is provided opposite to each other in the flow passage;

at least one pair of cathodes is provided opposite to the anodes in a direction nearly at right angles to the anodes without contacting the anodes in a space including the pair of anodes;

a set of electrodes is composed of said pair of anodes and said pair of cathodes;

a part or the whole of said anodes and said cathodes are composed of a plurality of plates or pillars and they are electroductively connected integrally; and a device for forming an magnetic field application device forming a direct current or alternate current magnetic field in the opposing direction of the cathodes is fixed to the discharge tube.

The present invention will be described below in detail.

The gases to be used in this invention are gases or vapors which are discharged from various semiconductor production facilities and when released into the atmosphere without treatment, may possibly cause some disaster or pollution. In particular, they cannot be completely treated by conventional catalyzed reactions and such means as absorption and adsorption. Examples of such gases applicable to this invention include silane gases such as monosilane and disilane; alkylsilane gases such as monomethylsilane and dimethylsilane; germanium gases; chlorosilane gases; fluoro silane gases; mixed gases containing doping gases, such as phosphine and diborane; and tetraethoxysilanes (TEOS) which have been recently spotlighted as a material for an insulated oxidized film. These are not the only examples, and mixtures of these, and those diluted with hydrogen or nitrogen may also be used in this invention.

The preferred embodiments of the invention will be described with reference to the accompanying drawings.

FIGS. 2 to 6 show examples of plate-like electrodes, and FIG. 7, examples of cylindrical electrodes.

FIG. 3 is a sectional view of FIG. 2 taken on the line III—III, and

FIG. 6 is a sectional view taken on the line VI—VI of FIG. 5.

FIGS. 1, 2, 4, 5 and 7 are sectional views taken in a direction at right angles to the direction of the gas flow passage. The flow of gases are either upward or downward.

In FIGS. 1 to 7, the reference numeral 1 represents a cathode or a cathode pair; the reference numeral 2 represents an anode or an anode pair; the reference numeral 3 represents a permanent magnet; the reference numeral 4 represents a vacuum container; and the reference numeral 5 represents an electrical conductor material.

In FIGS. 8 and 9, the reference numeral 1 represents a cathode or a cathode pair; the reference numeral 2 represents an anode or an anode pair; the reference numeral 2' represents an auxiliary anode; the reference numeral 3 represents a ferrite magnet; the reference numeral 4 represents an insulation material; the reference numeral 5 represents a gas introduction opening; the reference numeral 6 represents a gas leading opening; the reference numeral 8 represents a vacuum container; and the reference numeral 9 represents a yolk. Generally, many of discharge devices have such a structure that a cathode and an anode are opposite to each other. Since an electron linearly goes from the cathode to the anode in such a structure, it is not easy to form a plasma having a high strength. Furthermore, because the range of applicability to pressure variations is narrow, restrictions are imposed on the desired waste gas treating conditions.

Figure 1:
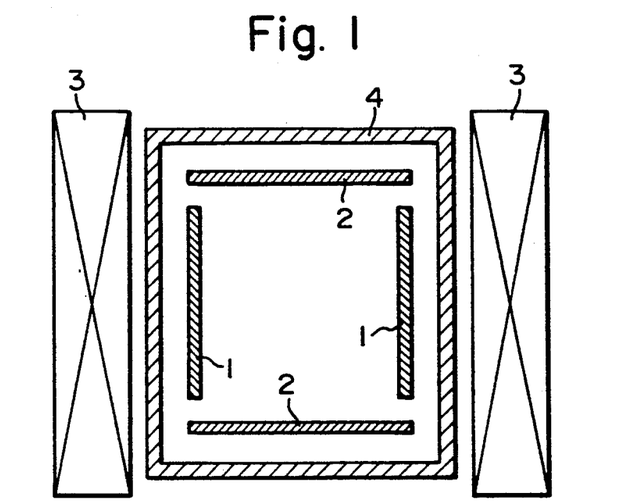
FIG. 1 is a horizontal section showing the basic concept of the prior art.

In contrast, the present invention as shown in FIG. 1 basically may form a cathode pair by providing a pair of cathodes opposite to each other and an anode pair by providing a pair of anodes opposite to each other, and further superimposing a magnetic field in the opposing direction of the cathodes. By utilizing a cyclone motion of an electron using a magnetic line of force as an axis, electrons are trapped between the opposing cathodes so that a plasma of very high strength can be formed. A stable plasma can be obtained which can withstand a wide range of pressure variations in a range of from 1 mtorr to 10 torr.

In this way, according to this invention, basically at least one pair of anodes 2 is provided opposite to each other, and at least one pair of cathodes 1 is provided in a space including the anode pair in a direction nearly at right angles to the anodes without contacting the anodes. Furthermore, a magnetic field is superimposed on the opposing direction of the cathodes, and a plasma having a high strength, called a cathode glow, is formed between the opposing cathodes. On the other hand in a space excluding the cathode glow portion between the opposing anodes a plasma called "positive column" is formed via a sheath. As a result, the gas to be treated is subjected to discharge treatment.

In the discharge treatment of a waste gas directed to render most of an unreacted gas non-toxic, for example, unlike plasma CVD etc. utilizing discharge-gas in the thin film formation utilizing a part of the starting gas, the amount of electric power required for the discharge treatment is extremely high. It is important to secure an electrode area which can withstand such a large amount of electric power within an apparatus of a limited volume. Particularly, to secure the cathode area for releasing electrons is essential for maintaining a stable plasma state.

The present inventors found that such an arrangement of electrodes is an effective means for increasing the electrode area so as to withstand the amount of electric power required for the discharge treatment that an auxiliary electrode as a means for increasing the electrode area an auxiliary electrode is disposed within a space formed of at least one pair of cathodes and at least one pair of anodes. (Japanese Laid-Open Patent Publication No. 297126/1989. However, such a treating apparatus is limited in treating ability with regard to the amount of a gas discharged from a semiconductor production facilities, and a further increase in the electric power is required to treat a large amount of the waste gas. This inevitably results in the necessity for increasing the electrode area. If the above-mentioned area is not sufficiently secured, the electrodes become red-hot, and further an arc-discharge may occur. As a result, structural damages such as electrical deformation or thermal deformation may occur, and the treating apparatus fails to function properly.

The above structural damages not only mean the damages of electrodes but also means that an insulator such as tetrafluoroethylene accumulates the heat generated by forming the discharge and is thermally deformed so that the construction of the electrodes cannot be maintained if in the case of the treating apparatus of Japanese Laid-Open Publication No. 287126/1989.

Figure 2:
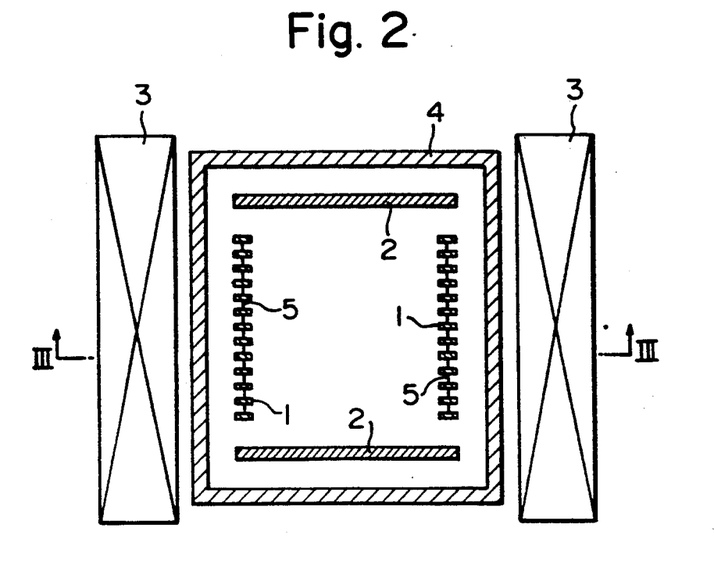
FIGS. 2, 4, 5 and 7 are horizontal sections showing the embodiments of the present invention.
Figure 3:
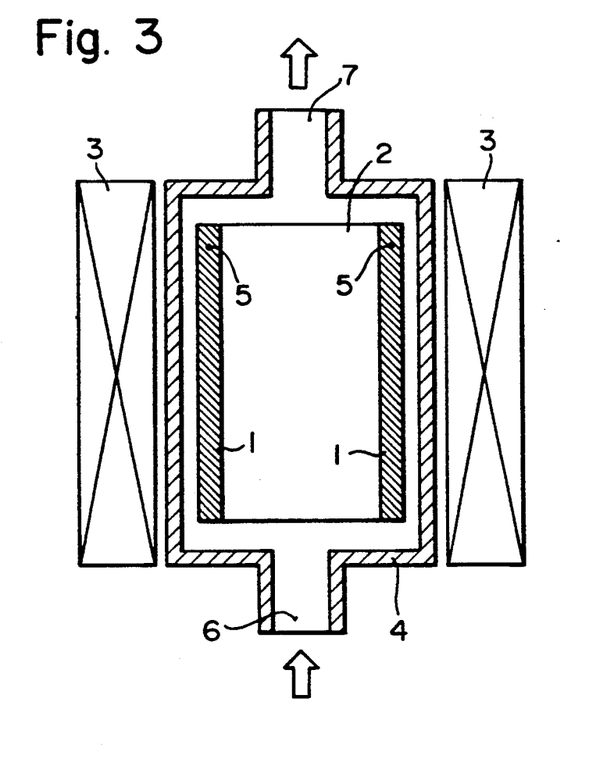
FIGS. 3 and 6 are vertical section views.

Thus, the present inventors made extensive investigations in order to secure an electrode area which can withstand the electric power. As a result, by constructing anodes 1 and cathodes 2 partly or wholly from a plurality of plates or pillars (or rods) and connecting and assembling them through electrical conduction and integrating them to form an electrode structure having the same action as the cathodes 1 and the anodes 3 shown in FIG. 1. FIGS. 2 to 7 show examples of such integrated plate-like or pillar-like electrode structures. In FIGS. 2 and 3, all of the cathodes are composed of a plurality of plates or pillars and in FIGS. 5 and 7, all of the cathodes and the anodes are composed of a plurality of plates or pillars. In the present invention, the "electrode area" is defined as an area surrounded by the same points of potentials on the electrodes.

In the present invention, the electrode area which can withstand the electric power inputted is a value in which the consumed current value is not more than 20 mA/cm$^2$, preferably not more than 10 mA/cm$^2$. The distance between the plurality of plates or pillars connected and assembled under electrical conduction as the shortest distance between adjacent cathodes or anodes, as the shortest distance, is preferably 0.1 mm to 20 mm, more preferably 1 mm to 10 mm.

In the opposing cathodes, the right opposing distance may vary depending upon the pressure and the composition of the gas to be treated, but the shortest distance between the opposing cathodes is preferably 5 mm to 80 mm, more preferably 10 mm to about 40 mm. Furthermore, in the case of anodes which oppose the cathode pair in a direction nearly at right angles, the shortest distance between the cathode and the anode is preferably 5 mm to 120 mm, more specifically 10 mm to 50 mm.

The material for the anode or the cathode is not particularly limited so long as at least its surface is electrically conductive. Usually it is stainless steel. The above cathode or anode measures 10 mm to 10000 mm in width, 100 mm to 100000 mm in length and 0.1 mm to 5 mm in thickness. In the case of a plate, it has a width of 1 mm to 100 mm, a length of 100 mm to 100000 mm and a thickness of about 0.1 mm to 5 mm. In the case of a cylinder, a circle taken on its section is about 1 mm to 30 mm in diameter and 100 mm to 100000 mm in length. The number of plates or pillars in one row is not particularly limited, and may be 2 to 200, preferably 5 to 50.

In the present invention, a plurality of plates or pillars are electrically conductively connected and integrated. Specifically, when an electric power is put on, they are connected so that an electric current flows so that overheating leading to wire breaking may not occur. The connecting means are arbitrary. But as shown in FIG. 2, a plurality of plates is disposed at nearly equal intervals (adjoining distances), preferably the plates are parallel to each other, and as a whole, the plates form nearly straight rows. These rows are preferably linked or cemented by a cylinder or square pillar as an electrically conductive materials (for example, round copper rods or stainless steel bolts and nuts, etc. Screwing, welding and soldering are conceivable as a means of connection or cementing. Of course, it is possible to dispose electrically conductive materials at the upper part of the container and suspend a plurality of plates at nearly equal intervals from the electrically conductive materials. No particular limitations are imposed in this regard.

Sets of these cathodes and anodes are set up in a tubular container. The shape of the container is not particularly limited, and it may be a cylindrical or square pillar. The device for applying a magnetic field to form a magnetic field in the direction directed toward the cathode may be set up either inside or out of the container, and the magnetic field may be a direct current one or alternate current one. The magnetic flux density to be applied is at lease 50 gausses at the lowest portion, preferably at least 100 gausses. From the standpoint of a practical waste gas treating device, the application device is preferably based on a ferrite sintered type magnet having an inexpensive and simple and convenient direct current magnetic field. The use of magnets as samarium-cobalt or neodymium-iron-boron type rare earth magnets is also effective. The opposing direction of the cathode includes a range of about 45° to 135°. The power supply used in this invention may be a direct current or alternate current. From the efficiency of electric power, a dc power supply is preferred.

Furthermore, in the present invention, the plasma in this invention exhibits current-voltage characteristics which can generally be regarded as constant voltage characteristics. To perform continuous and stable treatment of a gas, it is convenient to employ a constant output power supply or a constant-current power supply.

To perform a waste gas treatment by using the waste gas discharge treatment device of this invention, a gas to be treated is introduced from the gas introduction inlet into a plasma space on which a magnetic field is superimposed, the plasma space being defined by a magnetic field application device with a cathode pair and an anode pair. The introduced waste gas is subjected to discharge treatment for a predetermined residence time, and then discharged from the gas opening and released into the atmosphere via the vacuum discharge device. After discharging from the vacuum discharge device, it may further be subjected to non-toxification treatment. The loading conditions employed in this invention is about 1 m torr to 10 torr.

The following Examples further illustrate the invention in detail.

EXAMPLE 1

The same device as shown in FIGS. 2 and 3 was used. In a stainless steel vacuum container having an inner capacity of 3.7 liters and including a gas introduction opening 6 and a gas leading opening. Within the vacuum container, sixteen stainless steel plates as cathode plates having a width of 6 mm, a length of 400 mm, and a thickness of 2 mm (8 plates per row), two stainless steel plates having a width of 40 mm, a length of 400 mm, and a thickness of 2 mm as anode plates were used to construct electrode sets. At this time, the shortest distance between the opposing cathodes was adjusted to 20 mm, and the shortest distance between the cathode and the anode was adjusted to 25 mm. Ths shortest distance between the adjoining cathode plates was adjusted to 6 mm. The anode plates and cathode plates were integrated as shown in FIGS. 2 and 3 by using a round brass rods having a diameter of 3 mm.

As a magnetic field application device, a ferrite sintered magnet having a surface magnetic flux density of 900 gausses was used to form a dc magnetic field, and the cathode pair and the anode pair were coupled to a dc power supply. From the gas introduction opening, 100% monosilane gas (100 Sccm) was introduced, and subjected to a discharge treatment under a pressure of 0.2 torr by supplying an electric power of 850 W.

The discharge treated gas was measured by a quadrupole mass spectrometer between the gas leading opening and the vacuum discharge facility, and the concentration of the residual monosilane gas was 2.0%. The test was carried out under the above conditions with a cycle consisting of operation for 3 hours and suspension for 30 minutes. The operation could be performed stably over 100 hours.

COMPARATIVE EXAMPLE 1

The same discharge treatment as in Example 1 was carried out except that as a cathode plate, a stainless steel plate having a width of 40 mm, a length of 400 mm and a thickness of 2 mm was used as shown in FIG. 1. Gradually, the inside of the opposing cathodes were deformed and became red-hot, and after 30 minutes when the spark became unusual, the treatment had to be discontinued.

EXAMPLE 2

Figure 4:
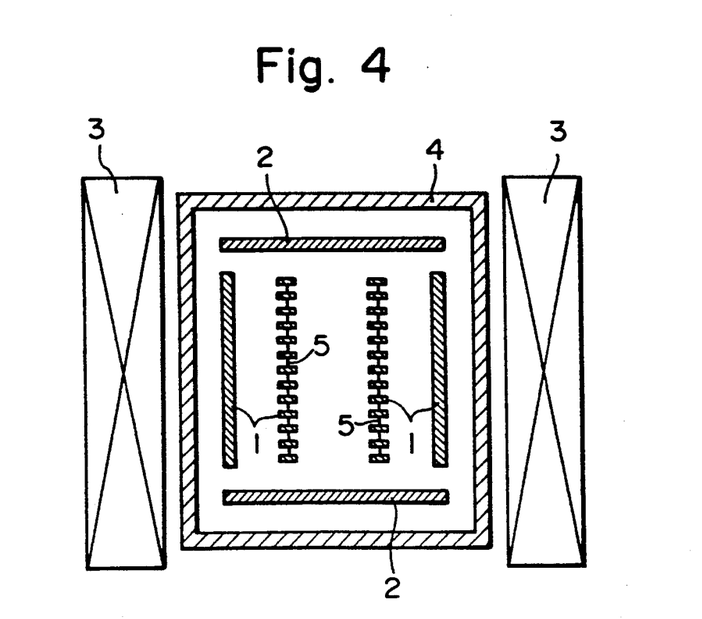

The same device as shown in FIG. 4 was used. In a stainless steel container having an inner capacity of 3.7 liters, 26 stainless steel plates having a width of 6 mm, a length of 400 mm and a thickness of 1 mm (13 plates per row) as cathode plates and two stainless steel plates having a width of of 37 mm, a length of 400 mm and a thickness of 2 mm as anode plates were used to construct sets of electrodes. The shortest distance between the opposing cathodes was adjusted to 8 mm, and the shortest distance between the cathode and the anode adjusted to 25 mm. The shortest distance between adjacent cathode plates was 2 mm. These cathode and anode plates were assembled integrally by using round copper rods having a diameter of 3 mm as shown in FIG. 4 as electrically conductive materials 5.

A dc magnetic field was formed, and the electrode sets were coupled to a dc power supply. From the gas introduction opening, 20% monosilane gas (250 Sccm) diluted with nitrogen was introduced, and treated at a pressure of 0.5 torr by supplying an electric power of 700 W. The amount of the residual monosilane gas was not more than 1%. No abnormality occurred in the continuous treatment for 3 hours. The same cycle text as in Example 1 was performed, but it was confirmed that no problem occurred.

EXAMPLE 3

Figure 5:
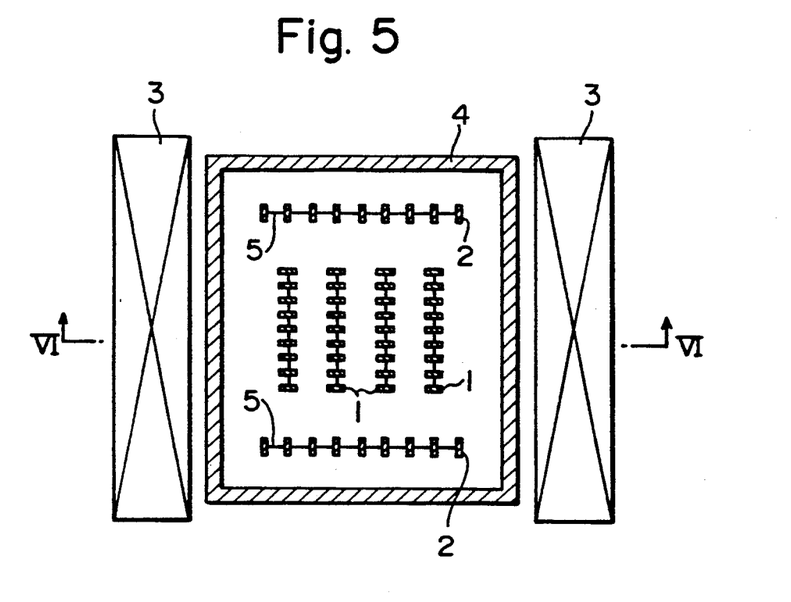
Figure 6:
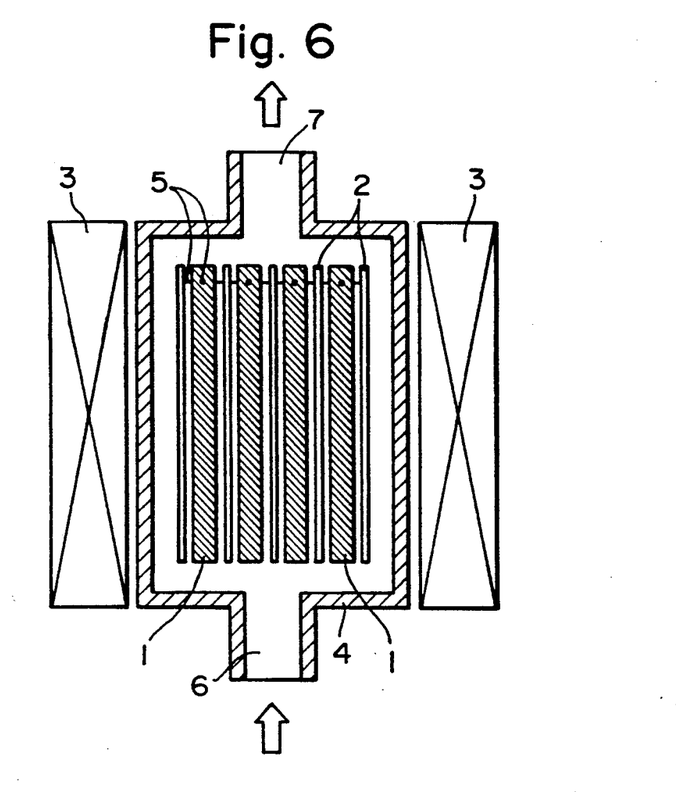

The same device as shown in FIGS. 5 and 6 was used. In a stainless steel vacuum container provided with a gas introduction opening 6 and a gas leading opening 7 and having an inner capacity of 8 liters, 36 stainless steel plates having a width of 8 mm, a length of 440 mm and a thickness of 2 mm (9 per row) as cathode plates and 18 (9 plates per row) stainless plates the same stainless steel plates were used to construct electrode sets. The shortest distance between adjacent cathode plates was adjusted to 4 m, and the shortest distance between anode plates adjusted to 9 mm. As shown in FIG. 5, the cathode plates and the anode plates were integrated by using M3 stainless steel bolts and nuts as electrically conductive materials 5.

By using a dc magnetic field and a dc power supply, 50% of monosilane gas (800 Sccm) diluted with nitrogen was treated at 0.3 to 0.4 torr. As a result, the amount of the residual monosilane gas was 2%. At this time, the current required for the discharging was 2200 mA. Under these conditions, the device was continuously operated for 8 hours. No problem arose. The cycle test was performed, but no problem occurred either.

EXAMPLE 4

Figure 7:
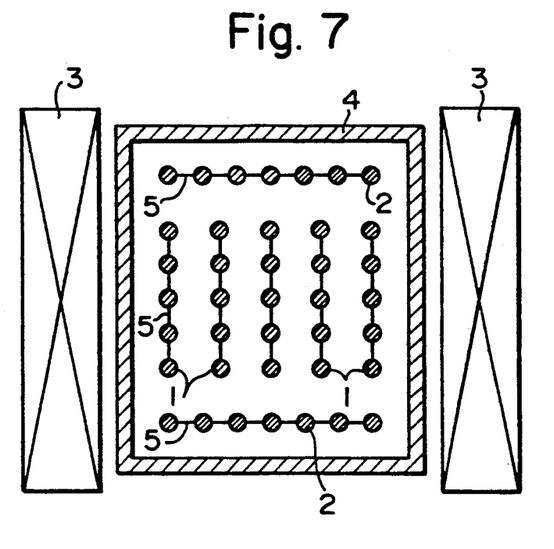

The same device as shown in FIG. 7 was used. In a stainless steel vacuum container equipped with a gas introduction opening and a gas leading opening and having an inner capacity of 5 liters, 25 stainless steel rods (7 per row) having a diameter of 6 mm, a length of 350 mm as cathodes and 14 same stainless rods (7 per row) to construct electrode sets. The shortest distance between adjacent cathodes and the shortest distance between adjacent anodes were 3 mm. The shortest distance between the opposing cathodes was adjusted to 10 mm, and the shortest distance between the cathode and the anode adjusted to 30 mm. By using a dc magnetic field and an ac power supply, 5% tetraethoxysilane diluted with nitrogen (500 Sccm) was subjected to discharge treatment at 0.5 torr. As a result, the decomposition rate of tetraethoxysilane was 85%, and a stable operation continued for 50 hours. After the treatment, the electrodes were taken out, and it was confirmed that a white deposit, judged to be $SiO_2$, formed on the surface of the electrodes. Accordingly, it was found that ethoxysilane could be treated. Most of the decomposition product accumulated on the bottom of the container. But it was confirmed that this is not determinant to the operation for a suffiently long period of time. The apparent power used for discharging was 4 KVA.

COMPARATIVE EXAMPLE 2

Figure 8:
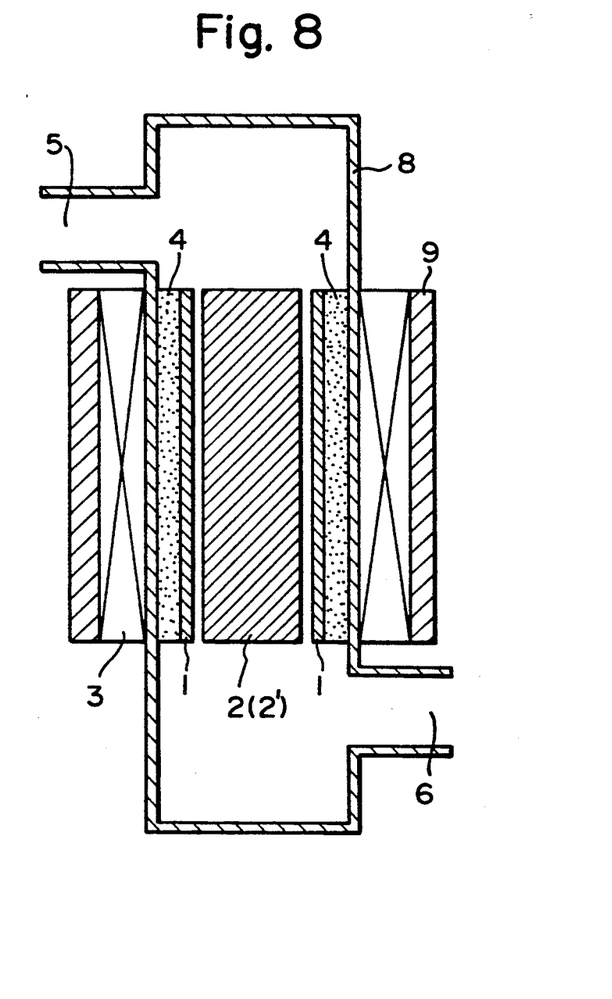
FIGS. 8 and 9 are a vertical section view and a horizontal section showing an embodiment of the prior art and correspond to each other.

The same device as shown in FIG. 8 (i.e., in FIG. 9) was used.

Figure 9:
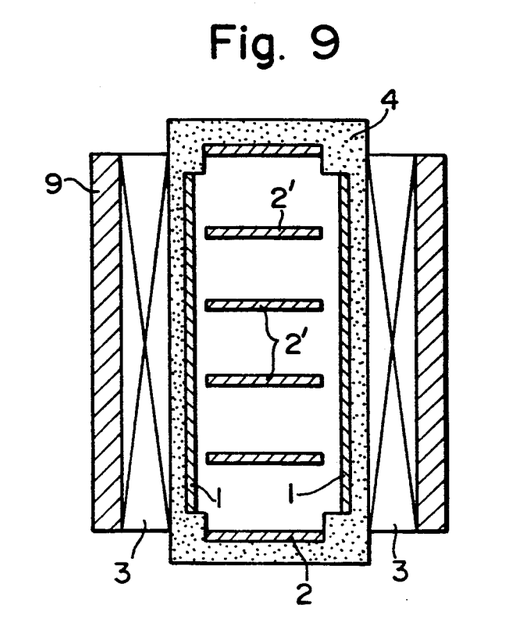

In a stainless steel vacuum container having an inner capacity of 2 liters equipped with 2-inch flanges a gas introduction opening 5 and a gas leading opening 6, one pair of stainless steel plates having a width of 20 cm, a length of 30 cm and a thickness of 2 mm was provided in opposition to each other with an interval of 3 cm to form a cathode pair 1, and in a space between the pair of cathodes via polytetrafluoroethylene 4 (Teflon, registered trademark) in its diameter direction, a pair of anodes was formed by providing stainless steel plates having a width of 2 cm, a length of 30 cm and a thickness of 2 mm to each other without contacting the anodes. Within a space including the pair of cathodes 1 and the pair of anodes four auxiliary anodes 2' having the same sizes as the anodes were provided nearly parallel to the anodes. To the back surfaces of the cathode, a ferrite magnet 3 having a surface magnetic flux density of 500 gausses was provided via Teflon 4. By a yolk 9, a dc magnetic field was formed in a direction opposite to the cathodes. The cathode pair and the anode pair were connected to an ac power supply. From the gas introduction opening 3, 100% monosilane gas (50 Sccm) was introduced to generate a plasma. From the gas leading opening 6, air was discharged by vacuum by a mechanical booster pump. A constant power was supplied to the cathode, and the concentration of the residual monosilane gas was at the gas lead-out opening was measured by a quadrupole mass spectrometer.

The concentration of the residual monosilane gas under constant conditions involving a pressure of 0.2 torr and a supplied power of 250 W was 3.0% when the distance between the anodes was 10 times that between the cathodes.

According to this, there can be provided a practical waste gas discharging treatment apparatus by which gases discharged from various semiconductor production facilities such as monosilane gas can be treated to render them non-toxic by discharge treatment. Accordingly, the waste gas treating apparatus of this invention contributes greatly to treat toxic gases occurring in the production of various semiconductor devices into non-toxic gases.

We claim:

1. A method for treating a waste gas, comprising the steps of:

providing a waste gas treating apparatus that includes a discharge tube comprising a tubular container having a gas introduction opening and a gas leading opening, at least one pair of anodes and cathodes placed within the container, a dc or ac power supply connected to electrodes, and a gas flow passage formed in the discharge tube, and wherein at least a pair of anodes is provided opposite to each other in the flow passage, at least a pair of cathodes is provided opposite to the anodes in a direction nearly at right angles to the anodes without contacting the anodes in a space including the pair of anodes, a set of electrodes is comprised of said pair of anodes and said pair of cathodes, a part or the whole of said anodes and said cathodes are comprised of a plurality of plates or pillars and are electroconductively connected integrally; and a device for forming a magnetic field application device forming a dc or ac magnetic field in the opposing direction of the cathodes is fixed to the discharge tube;

supplying a discharge current of not more than 20 mA/cm$^2$ from the dc or ac power supply;

forming a dc or ac magnetic field of at least 50 guasses flux density;

introducing from the gas introduction opening a waste gas selected from the group consisting of silane gases, alkylsilane gases, germanium gases, chlorosilane gases, fluorosilane gases, a mixed gas containing phosphine and diborane as a doping gas, and tetraethoxysilane gas; and treating the gas in the apparatus to reduce the toxicity of the waste gas.

2. The method according to claim 1 wherein the treating of the gas is carried out at a pressure of 1 m torr to 10 torr.

3. The method according to claim 1 wherein the silane gases are the group consisting of monosilane, disilane and mixtures thereof.

4. The method according to claim 1 wherein the alkylsilane gases are the group consisting of monomethylsilane, dimethylsilane and mixtures thereof.

5. The method according to claim 1 wherein the waste gas is diluted with at least one of hydrogen and nitrogen.

* * * * *